United States Patent
Hiruta et al.

(10) Patent No.: US 10,466,142 B2
(45) Date of Patent: Nov. 5, 2019

(54) EQUIPMENT CONTROL BASED ON FAILURE DETERMINATION

(71) Applicant: Hitachi, Ltd., Tokyo (JP)

(72) Inventors: Tomoaki Hiruta, Santa Clara, CA (US); Chetan Gupta, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 15/208,662

(22) Filed: Jul. 13, 2016

(65) Prior Publication Data
US 2018/0017467 A1    Jan. 18, 2018

(51) Int. Cl.
| | |
|---|---|
| G01M 99/00 | (2011.01) |
| G05B 17/02 | (2006.01) |
| G06F 17/18 | (2006.01) |
| G05B 23/02 | (2006.01) |

(52) U.S. Cl.
CPC .......... *G01M 99/008* (2013.01); *G05B 17/02* (2013.01); *G05B 23/0254* (2013.01); *G06F 17/18* (2013.01); *G05B 23/0221* (2013.01)

(58) Field of Classification Search
CPC ............ G01M 99/008; G05B 23/0221; G05B 23/0254; G06F 17/18
See application file for complete search history.

(56) References Cited

U.S. PATENT DOCUMENTS

| | | | | |
|---|---|---|---|---|
| 5,299,452 A | * | 4/1994 | Caron | F16D 66/00 701/70 |
| 6,332,354 B1 | * | 12/2001 | Lalor | B60T 8/00 701/70 |
| 7,260,501 B2 | | 8/2007 | Pattipatti et al. | |
| 2006/0064291 A1 | * | 3/2006 | Pattipatti | G05B 23/0251 703/14 |
| 2009/0295561 A1 | * | 12/2009 | Hu | G05B 19/41875 340/501 |
| 2013/0151101 A1 | * | 6/2013 | Szymanski | B60T 13/146 701/70 |
| 2016/0097699 A1 | * | 4/2016 | Leao | G07C 3/00 702/34 |

FOREIGN PATENT DOCUMENTS

| | | |
|---|---|---|
| JP | 2010-74988 A | 4/2010 |
| JP | 2015-158421 A | 9/2015 |
| WO | 99/06809 A1 | 2/1999 |

OTHER PUBLICATIONS

Extended European Search Report received in corresponding European Application No. 17180841.3 dated Dec. 6, 2017.
Japanese Office Action received in corresponding Japanese Application No. 2017-136255 dated Apr. 17, 2018.

* cited by examiner

*Primary Examiner* — Jaehwan Oh
(74) *Attorney, Agent, or Firm* — Mattingly & Malur, PC

(57) ABSTRACT

In some examples, a computing device may generate simulated data based on a physical model of equipment. For example, the simulated data may include a plurality of probability distributions of a plurality of degrees of failure, respectively, for at least one failure mode of the equipment. In addition, the computing device may receive sensor data indicating a measured metric of the equipment. The computing device may compare the received sensor data with the simulated data to determine a failure mode and a degree of failure of the equipment. At least partially based on the determined failure mode and degree of failure of the equipment, the computing device may send at least one of a notification or a control signal.

19 Claims, 12 Drawing Sheets

| EQUIPMENT ID | TIME | BRAKING TIME | CONDITION |
| --- | --- | --- | --- |
| A001 | 2016-03-22 12:00 | 100 | NORMAL |
| A001 | 2016-03-23 12:00 | 100 | NO DATA |
| A001 | 2016-03-24 12:00 | 120 | BAD |
| A001 | 2016-03-25 12:00 | 130 | NO DATA |
| A001 | 2016-03-26 12:00 | 130 | NO DATA |
| A001 | 2016-03-27 12:00 | 200 | BAD |
| A002 | 2016-03-22 13:30 | 80 | NO DATA |
| ... | ... | ... | ... |

| FAILURE MODE | DEGREE OF FAILURE | POSTERIOR PROBABILITIES |
|---|---|---|
| NORMAL | 0.0 | 0.05 |
| WORN | 0.1 | 0.10 |
| WORN | 0.2 | 0.40 |
| ··· | ··· | ··· |
| WORN | 1.0 | 0.01 |
| STICKING | 0.1 | 0.01 |
| ··· | ··· | ··· |
| STICKING | 1.0 | 0.01 |
| ··· | ··· | ··· |

| Equipment ID | Time | Brake Time | Machine Condition | Failure Mode | Degree of Failure |
|---|---|---|---|---|---|
| A001 | 2016-06-19 12:00 | 101 | Normal | Normal | 0.0 |
| A001 | 2016-06-20 12:00 | 150 | Warning | Worn | 0.5 |
| A001 | 2016-06-21 12:00 | 200 | Alert | Worn | 0.8 |
| A002 | 2016-06-21 15:15 | 150 | Warning | Sticking | 0.3 |
| ... | ... | ... | ... | ... | ... |

FIG. 11

EQUIPMENT CONTROL BASED ON FAILURE DETERMINATION

BACKGROUND

A statistical model may be used to make determinations and other types of predictions based on received data. For example, a statistical model is type of computational model that includes a set of assumptions concerning data based in part on information about similar data determined from a larger population of data. As one example, the set of assumptions included in a statistical model may describe a plurality of probability distributions. For instance, a statistical model may be configured with one or more mathematical equations that relate one or more random variables and, in some cases, non-random variables. Typically, prior to being used to make predictions, a statistical model may be trained using a quantity of historical data. However, in cases in which a sufficient quantity of training data is not available, it may be difficult to generate an accurate statistical model.

SUMMARY

Some implementations include arrangements and techniques for determining a condition of equipment and performing at least one action based on the condition. In some examples, a computing device may generate simulated data based on a physical model of the equipment. For instance, the simulated data may include a plurality of probability distributions of a plurality of degrees of failure, respectively, for at least one failure mode of the equipment. In addition, the computing device may receive sensor data indicating a measured metric of the equipment. The computing device may compare the received sensor data with the simulated data to determine a failure mode and a degree of failure of the equipment. At least partially based on the determined failure mode and degree of failure of the equipment, the computing device may send at least one of a notification or a control signal.

In some implementations, a computing device may receive a physical model of equipment, and may determine a difference between simulated data generated by the physical model and historical data for the equipment. Further, the computing device may generate a statistical model based on the simulated data. For instance, the statistical model may include a plurality of probability distributions for a plurality of degrees of failure, respectively, for at least one failure mode of the equipment. In addition, the computing device may receive sensor data indicating a measured metric of the equipment, and may normalize the received sensor data based on the difference. Further, based on the statistical model, the computing device may compare the received sensor data with the simulated data to determine a degree of failure of the equipment, and may perform at least one action based on the determined degree of failure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example data structure representative of historical data according to some implementations.

FIG. 9 illustrates an example data structure including posterior probabilities according to some implementations.

FIG. 11 illustrates an example data structure representative of analysis results determined from received sensor data according to some implementations.

DETAILED DESCRIPTION

Figure 1:
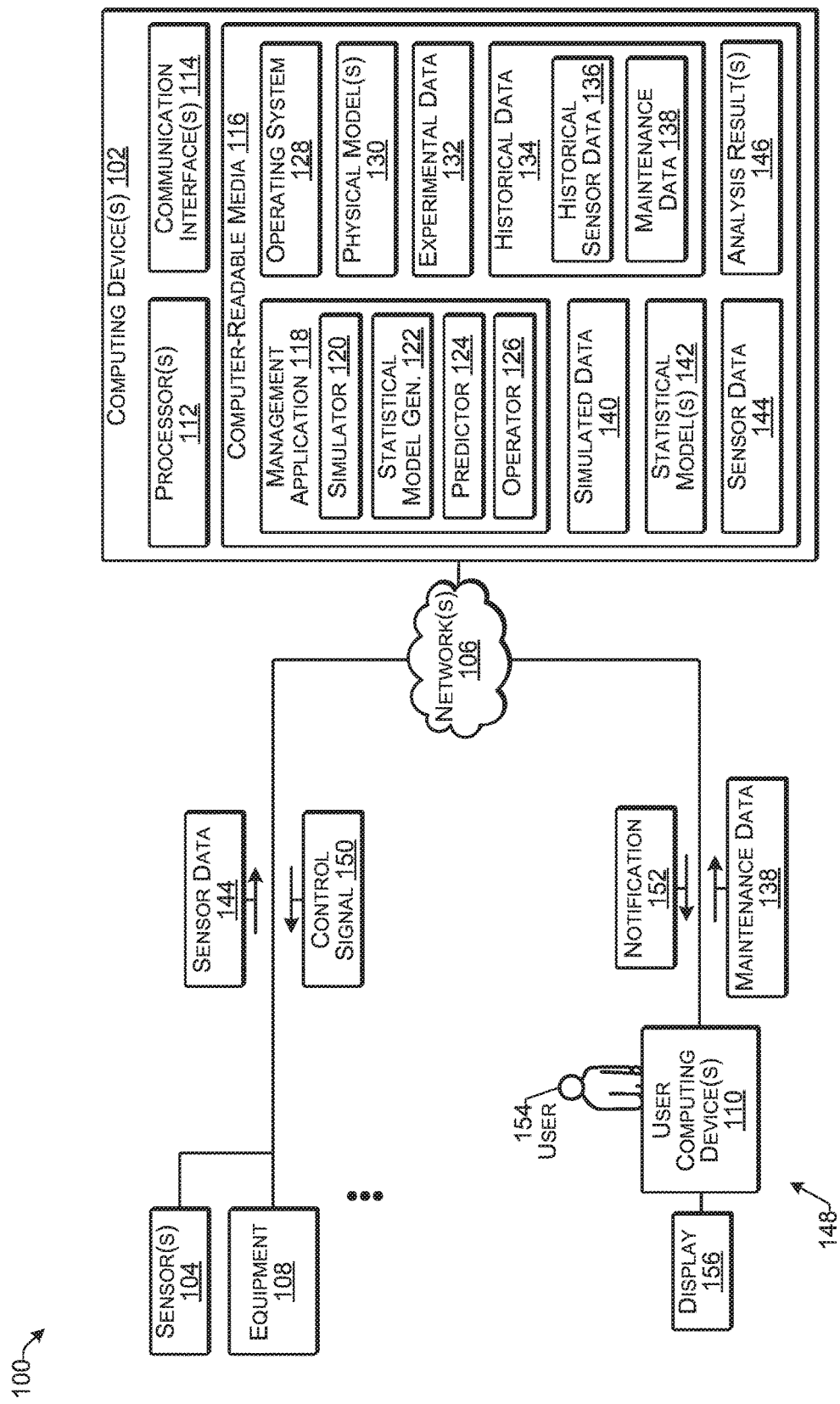
FIG. 1 illustrates an example architecture of a system able to control equipment and/or provide a notification according to some implementations.

Some implementations herein are directed to techniques and arrangements for condition-based monitoring, maintenance and/or control of equipment. The disclosed system may employ a physical model and a simulator to generate simulated data that can be used as training data by a statistical model generator in the absence of sufficient actual training data. Accordingly, the statistical model generator may provide a statistical model that may be used for analyzing real-time field data for generating analysis results that can be used by an operator. For instance, the operator may send a control signal for controlling equipment and/or may send a notification to a user computing device, such as to inform a user that maintenance of the equipment is recommended. Consequently, some examples herein enable condition-based maintenance and/or control in which a computing device monitors the condition of the equipment to determine whether maintenance should be performed on the equipment, whether the equipment should be shut down or otherwise controlled, whether an alert or other notification should be sent, or the like. Some examples enable condition-based maintenance and predictive maintenance based at least in part on predicting a failure mode and a degree of failure of the equipment from received sensor data.

In some examples, the computing device may enable condition-based control and or maintenance by receiving data from the equipment in the field, such as through a network connection or a direct connection. The computing device may store and analyze the received field data using a statistical model. When an analysis result indicates a threshold condition of the equipment, such as the occurrence of a particular failure mode of the equipment along with the degree of failure, the computing device may perform at least one action based on the indicated condition. The system can predict the failure mode and degree of failure through a comparison between the received sensor data and simulated data. The system may create the simulated data in advance of receiving the sensor data. Accordingly, the system is able to predict a failure mode and a degree of failure for equipment that has limited sensors and/or a low sampling rate.

For performing the condition-based control and maintenance monitoring, the computing device may create a statistical model, but may not have sufficient historical data for various different types of failures of the equipment. For example, in a typical statistical process, the statistical model may utilize a large amount of failure data regarding the target equipment to be able to provide accurate predictions regarding failure of the target equipment. However, for many types of equipment, such as in the case of sparse data, low sampling rates, etc., only a limited amount of failure data may be available for training the statistical model. Accordingly, to address this issue, some examples herein may utilize domain knowledge and experimental data to generate a physical model along with the statistical model. The physical model may include one or more equations that describe physical characteristics of the equipment. Accordingly, the physical model may be able to simulate a large variety of failure modes and degrees of failure. For example, the physical model may be used to generate simulated failure data, and the simulated failure data may be used to train the statistical model. After the statistical model has been trained, the computing device may use the statistical model to predict failure modes and degrees of failure for target equipment based on sensor data received for the target equipment.

The physical model may be created using experimental data and domain knowledge regarding the target equipment. The physical model may be used by a simulator to generate simulated data regarding normal operation modes, possible failure modes, and possible degrees of failure. Next, a statistical model generator may generate the statistical model using both historical data and the simulated data. During use of the statistical model for performing analysis, the use of the statistical model may include a normalization process for the received sensor data being analyzed and a prediction process. A predictor may use the statistical model to predict a failure mode and a degree of failure based on the received sensor data. In some examples, the sensor data may be received, such as through a direct connection or over a network, from one or more sensors associated with the target equipment and analyzed in near real time. The predictor may provide an analysis result to an operator, which may perform at least one operation based on the analysis results, such as controlling the target equipment and/or sending a notification to equipment personnel, or the like.

Some implementations herein may integrate historical data and simulated data into the statistical model. For example, the simulator may generate simulated data corresponding to historical data, such as for a normal operating mode and abnormal operating modes, which may include all possible failure modes and all possible degrees of failure. Moreover, the simulated data generated from the physical model may be measured, quantified, and/or normalized according to the same quantities as the sensor data measured by the sensors associated with the target equipment.

For discussion purposes, some example implementations are described in the environment of a computing device that trains a statistical model based on simulated data, receives sensor data from target equipment, and uses the statistical model to determine a condition of the equipment, such as for sending a notification and/or a control signal for controlling a brake or other equipment. However, implementations herein are not limited to the particular examples provided, and may be extended to other types of equipment, other types of environments, other system architectures, other types of computational models, and so forth, as will be apparent to those of skill in the art in light of the disclosure herein.

FIG. 1 illustrates an example architecture of a system 100 able to control equipment and/or provide a notification according to some implementations. The system 100 includes a least one computing device 102 that is able to communicate directly or indirectly with one or more sensors 104, such as through one or more networks 106. For instance, the sensors 104 may be associated with equipment 108 for measuring one or more metrics of the equipment 108. Further, the computing device 102 may be able to communicate through the one or more networks 106 with one or more user computing devices 110.

In some examples, the computing device 102 may include one or more servers, personal computers, embedded processors, or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used. Alternatively, such as in the case of an embedded system, an electronic control unit (ECU), or the like, the computing device 102 may include one or more vehicle ECUs, other types of embedded processors, or other programmable computing devices.

In the illustrated example, the computing device 102 includes, or may have associated therewith, one or more processors 112, one or more communication interfaces 114, and one or more computer-readable media 116. Each processor 112 may be a single processing unit or a number of processing units, and may include single or multiple computing units, or multiple processing cores. The processor(s) 112 can be implemented as one or more central processing units, microprocessors, microcomputers, microcontrollers, digital signal processors, state machines, logic circuitries, and/or any devices that manipulate signals based on operational instructions. For instance, the processor(s) 112 may be one or more hardware processors and/or logic circuits of any suitable type specifically programmed or configured to execute the algorithms and processes described herein. The processor(s) 112 may be configured to fetch and execute computer-readable instructions stored in the computer-readable media 116, which can program the processor(s) 112 to perform the functions described herein.

The computer-readable media 116 may include volatile and nonvolatile memory and/or removable and non-removable media implemented in any type of technology for storage of information such as computer-readable instructions, data structures, program modules, or other data. For example, the computer-readable media 116 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device 102, the computer-readable media 116 may be a tangible non-transitory medium to the extent that, when mentioned, non-transitory computer-readable media exclude media such as energy, carrier signals, electromagnetic waves, and/or signals per se. In some cases, the computer-readable media 116 may be at the same location as the computing device 102, while in other examples, the computer-readable media 116 may be partially remote from the computing device 102.

The computer-readable media 116 may be used to store any number of functional components that are executable by the processor(s) 112. In many implementations, these functional components comprise instructions or programs that are executable by the processor(s) 112 and that, when executed, specifically program the processor(s) 112 to perform the actions attributed herein to the computing device 102. Functional components stored in the computer-readable media 116 may include a management application 118. The management application 118 may include one or more computer programs, computer-readable instructions, executable code, or portions thereof that are executable to cause the processor(s) 112 to performing various tasks, such as for monitoring and controlling target equipment 108 and sending notifications to maintenance personnel, equipment operators, or other equipment personnel. In the illustrated example, the management application 118 includes a simulator 120 for generating simulated data, a statistical model generator 122 for generating a statistical model at least partially from the simulated data, a predictor 124 for using the statistical model for making a predication, and an operator 126 for performing at least one operation based on the prediction. Each of these components may be an executable module of the management application 118, or a portion thereof. Alternatively, in other examples, some or all of these components may be separately executable computer programs.

Additionally, the functional components may include an operating system 128 that may control and manage various functions of the computing device 102. In some cases, the functional components may be stored in a storage portion of the computer-readable media 116, loaded into a local memory portion of the computer-readable media 116, and executed by the one or more processors 112. Numerous other software and/or hardware configurations will be apparent to those of skill in the art having the benefit of the disclosure herein.

In addition, the computer-readable media 116 may store data and data structures used for performing the functions and services described herein. For example, the computer-readable media 116 may store one or more physical models 130, experimental data 132, such as may be used for determining the physical model 130, historical data 134, which may include historical sensor data 136 and historical maintenance data 138, simulated data 140, which may be generated by the simulator 120, a statistical model 142, which may be generated by the statistical model generator 122, sensor data 144, which may be received from the sensor(s) 104 and/or the equipment 108, and one or more analysis results 146, which may be generated based on the statistical model 142 and the sensor data 144. For example, the management application 118 may receive the sensor data 144 related to the equipment 108, and may use the statistical model 142 and the sensor data 144 to determine at least one analysis result 146 indicative of a current condition of the equipment 108.

As discussed additionally below, the management application 118 may use determinations made from the statistical model 142 to perform functions, such as controlling the equipment 108, monitoring the equipment 108 for failure, sending alerts or other notifications to equipment personnel such as at the user computing device 110, or the like. The computing device 102 may also include or maintain other functional components and data, which may include programs, drivers, etc., and other data used or generated by the functional components. Further, the computing device 102 may include many other logical, programmatic, and physical components, of which those described above are merely examples that are related to the discussion herein.

The communication interface(s) 114 may include one or more interfaces and hardware components for enabling communication with various other devices, such as over the one or more networks 106. Thus, the communication interfaces 114 may include, or may couple to, one or more ports that provide connection to the network(s) 106 for communicating with the sensor(s) 104, the equipment 108, and/or the user computing device(s) 110. For example, the communication interface(s) 114 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel), direct connections, as well as close-range communications, such as BLUETOOTH®, and the like, as additionally enumerated below.

The one or more networks 106 may include any type of network, including a LAN, such as an intranet; a WAN, such as the Internet; a wireless network, such as a cellular network; a local wireless network, such as Wi-Fi; short-range wireless communications, such as BLUETOOTH®; a wired network including fiber optics, Ethernet, Fibre Channel, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the computing device 102, the sensor(s) 104 and/or the equipment 108, and the user computing device(s) 110 are able to communicate over the one or more networks 106 using wired or wireless connections, and combinations thereof.

In some examples, the computing device 102 may receive the sensor data 144 from the one or more sensors 104 that are associated with the equipment 108 for measuring one or more characteristics or other metrics of the equipment 108. For instance, the management application 118 may use the received sensor data 144 about the equipment 108 for analyzing the condition of the equipment 108. Based on the determined condition of the equipment 108, the management application 118 may send a control signal 150 for controlling the equipment 108, and/or may send a notification 152 to the user computing device 110 to notify a user 154, such as equipment personnel, regarding a condition of the equipment 108. Thus, in some examples, at least one user computing device 110 may be part of a monitoring system 148 for monitoring the equipment 108.

The sensor(s) 104 may monitor a single target equipment 108, or may monitor multiple pieces of equipment 108. The sensor(s) 104 may include the ability to communicate over the network 106 with the computing device 102, such as to send the sensor data 144 to the computing device 102. In some cases, the sensor(s) 104 or a device associated therewith may include a hardware configuration similar to that described for the computing device 102, but with different functional components and data to enable the sensor(s) 104 to perform the various measurement and communication functions discussed herein.

In other examples, the sensor(s) 104 may be integrated into the equipment 108, the equipment 108 may communicate directly with the computing device 102, and the computing device 102 may communicate directly with the equipment 108. In this case, the management application 118 may receive the sensor data 144 from the equipment 108, and may directly control the equipment 108 using the control signal 150 based on the sensor data 144 received from the equipment 108.

The user computing device(s) 110 may be any suitable type of computing devices such as a desktop, workstation, server, laptop, tablet computing device, mobile device, smart phone, wearable device, or any other type of computing device able to send and receive data over a network. In some cases, the user computing device 110 may include hardware configurations similar to that described for the computing device 102, but with different data and functional components to enable the user computing device 110 to perform the various functions discussed herein. In some examples, the user computing device 110 may include a display 156 such as for presenting a notification 152 received from the management application 118. For instance, the notification 152 may provide the user 154 with an indication of the condition of the equipment 108. Furthermore, in the case that the user 154 is a maintenance worker or other equipment personnel, the user 154 may use the user computing device 110 to enter maintenance data 138 regarding the equipment 108, such as for sending the maintenance data 138 to the computing device 102. Alternatively, in other examples, the equipment 108 may be used to send the maintenance data 138 to the computing device 102. For example, the maintenance data 138 may include the identity of the maintenance worker or other equipment personnel, an identifier (equipment ID) of the equipment 108, a time at which the maintenance or other check of the equipment 108 was performed, and a result of the maintenance, such as a condition of the equipment 108 and any maintenance performed on the equipment 108.

Figure 2:
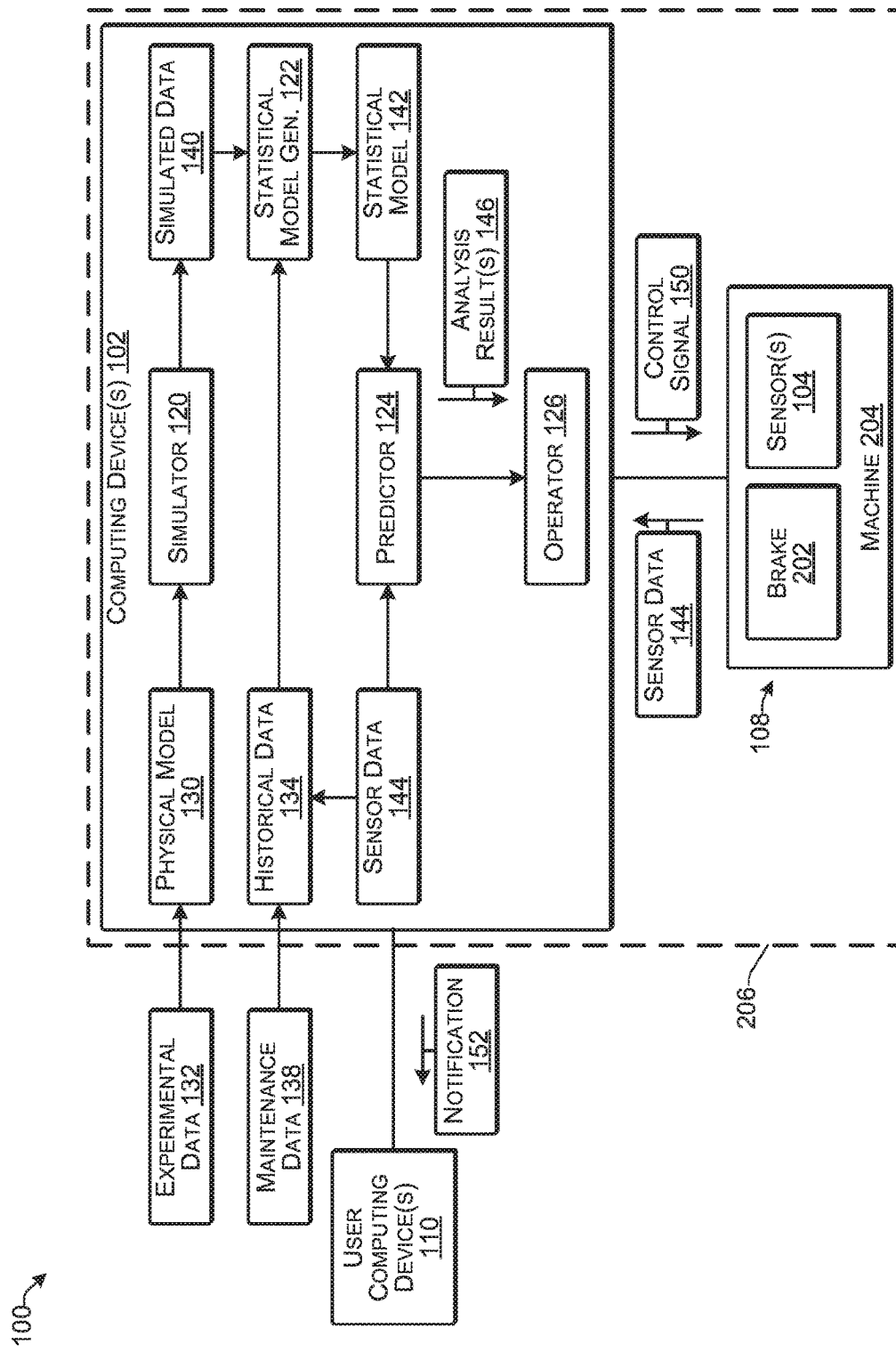
FIG. 2 illustrates an example of operations performed by the system of FIG. 1 according to some implementations.

FIG. 2 illustrates an example of operations of the system 100 according to some implementations. In this example, suppose that the equipment 108 includes a brake 202 that is a component of a machine 204. As one example, the machine 204 may be an elevator that uses the brake 202 for controlling movement of the elevator, such as during stopping of the elevator, holding the elevator in position while passengers load or unload, and so forth. In other examples, the machine 204 may be a vehicle, such as a train, truck, bus, automobile, airplane, or the like, and the brake 202 may be used for slowing or stopping the vehicle. In still other examples, the machine 204 may be any other type of machine that uses a brake during its operation.

In some cases, as indicated by the dashed line 206, the computing device 102 may be at least partially included in of the machine 204 and/or may be co-located with the machine 204, while in other cases, the computing device 102 may be located remotely from the machine 204 such as in communication with the machine 204 over the one or more networks 106 discussed above. Furthermore, while this example describes the operation of the system 100 through an implementation of the equipment 108 with a brake component 202, in other examples, the system 100 may be used for monitoring and controlling other types of equipment 108 and machines 204.

In the illustrated example, the sensor(s) 104 may receive the sensor data 144 from the sensors 104, and may send the sensor data 144 to the computing device 102. In some examples, the sensor(s) 104 may send the sensor data 144 at regular intervals such as on a daily basis, hourly basis, or other desired interval. For instance, the sensor(s) 104 may periodically receive a measurement of the braking time from the sensors 104, and may determine a mean braking time over the interval. As one example, the braking time may be the length of time that the brake 202 itself or the machine 204 takes to come to a complete stop after brake 202 is applied. Accordingly, the sensors 104 may include at least a timer for measuring the braking time. In addition, the sensors 104 may include various other types of sensors for measuring other metrics of the equipment 108, such as an acceleration sensor for measuring deceleration of the machine 204 and/or the brake 202; a force sensor for measuring a braking force applied by the brake; a current sensor for measuring the amount of current used by a motor for applying the brake; a hydraulic sensor for measuring an amount of fluid pressure used for applying the brake; and so forth.

When the computing device 102 receives the sensor data 144 as real time field data, the computing device 102 may provide the sensor data 144 to the predictor 124, such as for enabling a near-real-time determination of the condition of the equipment 108. For instance, the near real-time determination may be "near real time" based at least in part on the time interval at which the sensor data 144 is received from the sensor(s) 104.

In addition, the computing device 102 may store the sensor data 144 with the historical data 134. For instance, the computing device 102 may accumulates the real time sensor data 144 in a storage device or other computer-readable media that stores the historical data 134. The historical data 134 may also include the maintenance data 138 that is received from the maintenance workers or other equipment personnel, such as may be extracted from maintenance reports that are uploaded by the maintenance workers.

The physical model 130 describes physical phenomenon as one or more equations. In this example, the physical model 130 may include one or more formulas that describe the operation and characteristics of brake 202, such as in terms of Newtonian physics, e.g., static and/or dynamic representations of the brake 202 and the domain of the machine 204. Accordingly, the physical model 130 may include formulas that describe interaction between the machine mass, the brake coefficient of friction, the applied braking force, and various other physical properties and characteristics of the brake 202 and the machine 204, depending on the actual physical configuration of the brake 202 and the machine 204. The generation of physical models is the subject of numerous physics and engineering textbooks and, accordingly, additional description of the initial generation of the physical model 130 is not provided herein.

Furthermore, the physical model 130 may include the ability to describe normal and abnormal modes of operation of the equipment 108, including all possible failure modes and degrees of failure. Examples of brake failure modes may include brake wear, brake sticking, brake obstruction, and/or failure of the braking motive force, such as failure of an electric motor or hydraulic system used to apply the brakes. Additionally, according to some examples herein, the degree of failure may range from 0 to 1, although other ranges, such as 0% to 100%, may be used in other examples. When the degree of failure is 0, the brake component may be categorized as being in the normal condition. As the brake 202 becomes worn, or the operation of the brake 202 otherwise becomes worse, the degree of failure may approach 1, and the brake may be categorized as being in a failure mode.

The physical model 130 may be generated and verified based at least in part on experimental data 132 that may be received by the computing device 102 such as from one of the user computing devices 110. For example, equipment personnel or other user may perform one or more experiments with the equipment 108 to determine various failure modes and degrees of failure for the equipment 108. Accordingly, the experimental data 132 may provide domain knowledge regarding the equipment 108. As discussed additionally below, the physical model 130 may be used by a simulator 120 to produce simulated data 140. The simulated data 140 may be evaluated based on the experimental data 132. In some examples, the physical model 130 may be adjusted or otherwise changed based on the evaluation results. When the physical model has been indicated to produce sufficiently accurate simulated data 140 (e.g., within a threshold deviation of the experimental data 132), the simulated data 140 along with the historical data 134 may be provided to the statistical model generator 122. The statistical model generator 122 may be configured to train a statistical model 142 using the simulated data 140. In some examples, the trained statistical model 142 may be evaluated for accuracy before being provided to the predictor 124. Further, the statistical model generator 122 may determine a difference "A" between the simulated data and the historical data 134 that may be used for normalizing the sensor data 144 during use of the statistical model.

When generation of the statistical model 142 is complete, the statistical model 142 is provided to the predictor 124. The predictor 124 may use the statistical model 142 and the received sensor data 144 for determining an analysis result 146 that is indicative of a current condition of the brake 202. The operator 126 may receive the analysis result 146 determined by the predictor 124, and may perform at least one operation based on the analysis result 146. The analysis result 146 may further be stored by the predictor 124 in the computer-readable media 116, such as in a database or other storage architecture.

Examples of operations that the operator 126 may perform based on the analysis result 146, may include sending an alert or other notification 152 to the user computing device(s) 110. Additionally, or alternatively, the operator 126 of the management application 118 may automatically adjust a setting or otherwise control the equipment 108. Thus, the analysis result 146 may be used as feedback for controlling the equipment 108 and thereby improves the operation of the equipment 108. For example, suppose that the machine 204 is an elevator, and the analysis result indicates that the brake 202 has failed or is close to failure (e.g., the degree of failure exceeds a specified threshold). The operator 126 may send the control signal 150 to the elevator such as for shutting down the elevator to prevent the elevator from being used until the brake 202 can be repaired. As another example, if the analysis result 146 indicates that insufficient braking force is being applied, the operator 126 may send the control signal 150 to the machine 204 for increasing the motive force applied to the brake 202. As another example, such as in the case that the machine is a vehicle, such as a train, truck, bus, automobile, airplane, or the like, the operator 126 may increase the braking force in response to determining that the wear on the brake 202 exceeds a threshold degree of failure, and/or may send an alert or other notification that is presented to an operator of the vehicle to warn the operator of the vehicle of the detected brake condition. Numerous other variations will be apparent to those of skill in the art depending at least in part on the nature of the machine 204 and the equipment 108.

Examples of suitable statistical models 142 that may be used in some implementations herein may include predictive models, decision trees, classifiers, regression models, such as linear regression models, support vector machines, and stochastic models, such as Markov models and hidden Markov models, artificial neural networks, such as recurrent neural networks, and so forth. Accordingly, implementations herein are able to provide predictions according to received sensor data 144. The analysis result 146 may provide an indication of the condition of the equipment 108 and may improve the operation of the equipment 108 by enabling more precise control of the equipment 108, emergency shutdown of the equipment, and the like.

Additionally, in some examples, a portion of the operations described herein may be performed by a first one of the computing devices 102 that is remote from the machine 204, and another portion of the operations may be performed by a second one of the computing devices 102 that is co-located with or included in the machine 204. As one example, the first computing device 102 may include the physical model 130, the simulator 120, and the statistical model generator 122 for performing operations such as for generating the simulated data 140 and the statistical model 142. Subsequently, the statistical model 142 may be provided to the second computing device 102 that includes the predictor 124 and the operator 126. Thus, on the second computing device 102, the predictor 124 may receive the sensor data 144 and provide an analysis result 146 to the operator 126. The operator 126 may send one or more of the control signal 150 or the notification 152 based on the analysis result 146. As one example, the first computing device 102 may be a server, personal computer, or the like, and the second computing device 102 may be an embedded computing device, such as an ECU, or the like. Numerous other variations will be apparent to those of skill in the art having the benefit of the disclosure herein.

FIG. 3 illustrates an example data structure 300 representative of historical data according to some implementations. In this example, the data structure 300 is a table that includes an equipment ID 302, such as an identifier of the monitored equipment, time 304, a braking time 306, and a condition 308. Each row corresponds to a measured braking time 306 for a different sensor reporting interval. For example, suppose that, on a daily basis, the sensor sends, to the computing device 102, a sensed braking time for the target equipment. In some cases, the sensed braking time 306 may be the mean of a plurality of measured braking times measured over the time interval. Alternatively, the braking time 306 may be a single braking time measurement taken during the interval, but this may result in less accurate measurements. Further, in other examples, the historical data may include other or additional parameters measured by a sensor, such as braking force, energy expended applying the brake, or the like.

The time 304 may indicate the date and time at which the sensor data was received by the computing device 102 (or alternatively, recorded or sent by the sensor(s) 104). Further, the condition 308 may indicate a condition of the equipment 308 indicated by a maintenance worker or other equipment personnel. For example, the maintenance worker may periodically check the condition of the equipment and may file a maintenance report based on the determined condition. The maintenance report may include the condition of the equipment observed by the maintenance worker. The reported condition may be correlated to a particular date and time based on a date included with the maintenance data.

For many types of equipment, maintenance checks may typically be performed only occasionally, such as once a month, once every two weeks, or the like. If a maintenance report was not received for a particular interval, or the maintenance report did not include any reported condition of the equipment, the condition may indicate "No data". The statistical model generator may use the condition information for performing a normalizing process, as discussed additionally below. In this process, the statistical model generator may employ historical data regarding normal conditions. As indicated by the example of FIG. 3, there may be very sparse data regarding various failure modes for the equipment 108. Thus, the historical data alone may be insufficient to train an accurate statistical model.

FIGS. 4, 5, 6, 8, and 12 include flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

Figure 4:
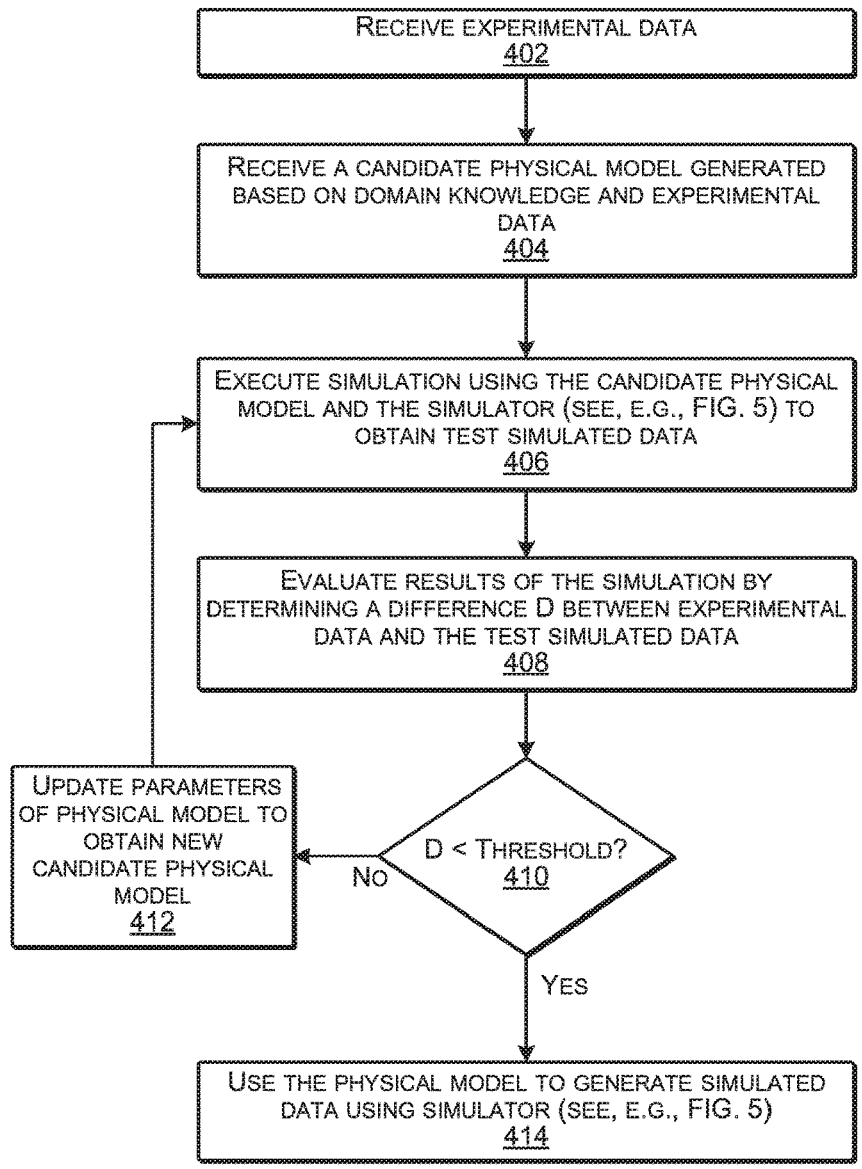
FIG. 4 is a flow diagram illustrating an example process for determining a physical model according to some implementations.

FIG. 4 is a flow diagram illustrating an example process 400 for generating a physical model according to some implementations. In some examples, the process 400 may be executed at least partially by the computing device 102 or other suitable computing device.

At 402, the computing device may receive the experimental data. For example, a user, such as a person having knowledge of the equipment 108, may gather experimental data by testing the equipment 108. As one example, the experimental data may be collected with a relatively high sampling rate for various different failure modes of the equipment and for various degrees of failure. For instance, in the case that the equipment is a brake, the experiments may include determining the stopping time of the brake at various different levels of wear, under various different loads, or the like. In some cases, additional sensors may be used, such as for determining deceleration information, load information, braking force, and other metrics.

At 404, the computing device may receive a candidate physical model created based on domain knowledge and the experimental data. For example, the user may determine a candidate physical model based on knowledge of the equipment configuration and the intended use (i.e., the domain knowledge), and further based on the experimental data.

At 406, the computing device may execute a simulation using the candidate physical model and the simulator to generate test simulation data. As discussed additionally below, the simulator may be an algorithm, computer program, or the like, that is configured to provide a plurality of different parameters to the physical model for determining results for various different failure modes and various degrees of failure of the various different failure modes. In some cases, the output of the simulator may be simulated data that is in the form of a plurality of probability distributions, as discussed additionally below. One example of executing the simulation is discussed below with respect to FIG. 5.

At 408, the computing device may evaluate the results of the simulation by determining a difference D, between the test simulated data and the experimental data. For example, the test simulated data may be compared to the experimental data to determine the difference D between the simulated data and the experimental data.

At 410, if the difference D between the simulated data and the experimental data exceeds a threshold deviation, the process goes to 412. On the other hand, if the difference D between the simulated data and the experimental data is less than the threshold deviation, the process goes to 414. In some examples, the threshold deviation may be determined based on an acceptable level of error in the statistical model.

At 412, when the difference D between the simulated data and the experimental data is more than the threshold deviation, the computing device may update or otherwise change one or more parameters of the candidate physical model, and the process may return to 406 to perform the simulation again with the changed parameter(s). The process from 406-410 may be repeated until the difference D is smaller than the threshold deviation.

At 414, when the difference D between the simulated data and the experimental data is less than the threshold deviation, the physical model may be considered to be sufficiently accurate, and the computing device may use the physical model and the simulator to generate simulated data for use in generating the statistical model, as discussed below with respect to FIG. 5.

Figure 5:
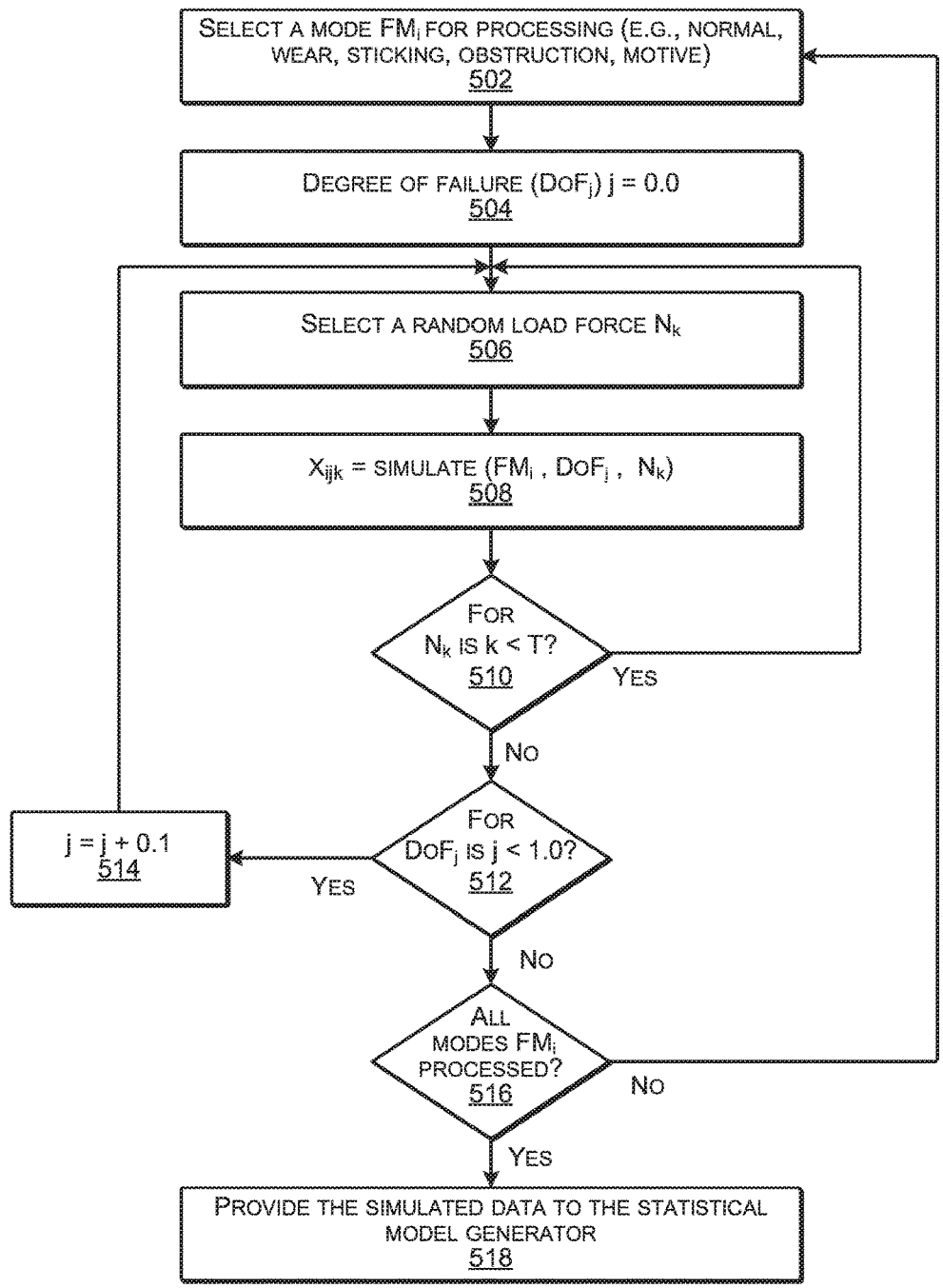
FIG. 5 illustrates an example of generating simulated data according to some implementations.

FIG. 5 is a flow diagram illustrating an example process 500 for generating simulation data according to some implementations. In some examples, the process 500 may be executed by the computing device 102 or other suitable computing device. After the physical model has been created, the simulator may generate simulated data for the normal mode and for every failure mode, and for every degree of failure of every failure mode. In some examples, the simulated data may be in the form of probability distributions. To generate a distribution for every failure mode and degree of failure, the load on the system may be modeled as a distribution, such as a Poisson or a Gaussian distribution. For instance in the case of an elevator, the load may be modeled based at least partially on the weight of the passengers of the elevator and the elevator itself; in the case of a vehicle, the load may be modeled based on passengers, fuel, vehicle weight; and so forth. The simulator may sample data randomly based on the probability distribution, may create a distribution of braking time for a given failure mode and given degree of failure. FIG. 5 includes an example process for creating distributions for multiple failure modes and multiple degrees of failure per failure mode.

At 502, the computing device may select a mode $FM_i$ for processing (e.g., normal, worn, sticking, obstruction, motive failure). For instance, the process may determine a probability distribution for each degree of failure for each selected mode.

At 504, the computing device may start at a first degree of failure for the selected mode, e.g., $DoF_j=0.0$. In the examples herein, 0.0 may represent no failure and 1.0 may represent complete failure, although other ranges may be used in other examples.

At 506, the computing device may select a random load $N_k$. For instance, as mentioned above, the load on the system may be modeled as a distribution, such as a Poisson or a Gaussian distribution.

At 508, the computing device may determine the probability distribution, such as based on $x_{ijk}$=simulate (FM$_i$, DoF$_j$, N$_k$), where FM$_i$ is the ith failure mode; DOF$_j$ is the jth degree of failure; N$_k$ is the kth randomly sampled load force selected randomly, e.g., from a Poisson distribution of load forces; T is the number of samples simulated, e.g., from k=1 to k=T; and $x_{ijk}$ is the braking time simulated with FM$_i$, DOF$_j$, and N$_k$. The simulated data may be represented as histograms of the braking time for every degree of failure for every failure mode, as discussed additionally below. Additionally, in other examples, $x_{ijk}$ may be other parameters, such as braking force. As still another example, $x_{ijk}$ may be not one variable but multiple variables. For example, $x_{ijk}$ may be a vector that includes the braking time and braking force, or other simulated parameter.

At 510, the computing device may determine whether k for the randomly sampled load force load N$_k$ is less than a predefined number T. For instance, when one load force, N$_k$, i.e., the kth randomly sampled load force, is inputted, the simulator calculates one braking time. Consequently, to obtain a probability distribution (e.g., as a histogram) of the braking times, the simulator may calculate the braking times T times, such as 1000 times. The number T may be defined in advance to ensure an adequate number of samples are determined for obtaining a sufficient distribution for each degree of failure at each failure mode. Accordingly, when the number of sampling, k, reaches T, the processes proceeds to 512 so that the DOF$_j$ is updated. If, for N$_k$, k is less than T, the process returns to 506 to selected another random load force N$_k$ and calculate another braking time for the current probability distribution.

At 512, the computing device may determine if the degree of failure DoF$_j$ has reached 1.0. If not, the process goes to 514, so that the DOF$_j$ may be incremented and the process is repeated for the next degree of failure.

At 514, if the degree of failure (DOF$_j$) is less than 1.0, the computing device may increment the DoF$_j$, e.g., j=j+0.1, and the process is repeated for the next degree of failure. In the examples herein, the degrees of failure may be incremented in tenths from 0.0 to 1.0, although other ranges and/or increments may be used in other examples.

At 516, if the degree of failure DoF$_j$ has reached 1.0, the computing device may determine whether there are any other failure modes FM$_i$ that have not yet been processed. If so, the process may return to block 502 to select a next failure mode for producing simulated data for the next failure mode FM$^i$.

At 518, on the other hand, if simulation data has been generated for all of the modes FM$_i$, the computing device may provide the simulated data to the statistical model generator.

Figure 6:
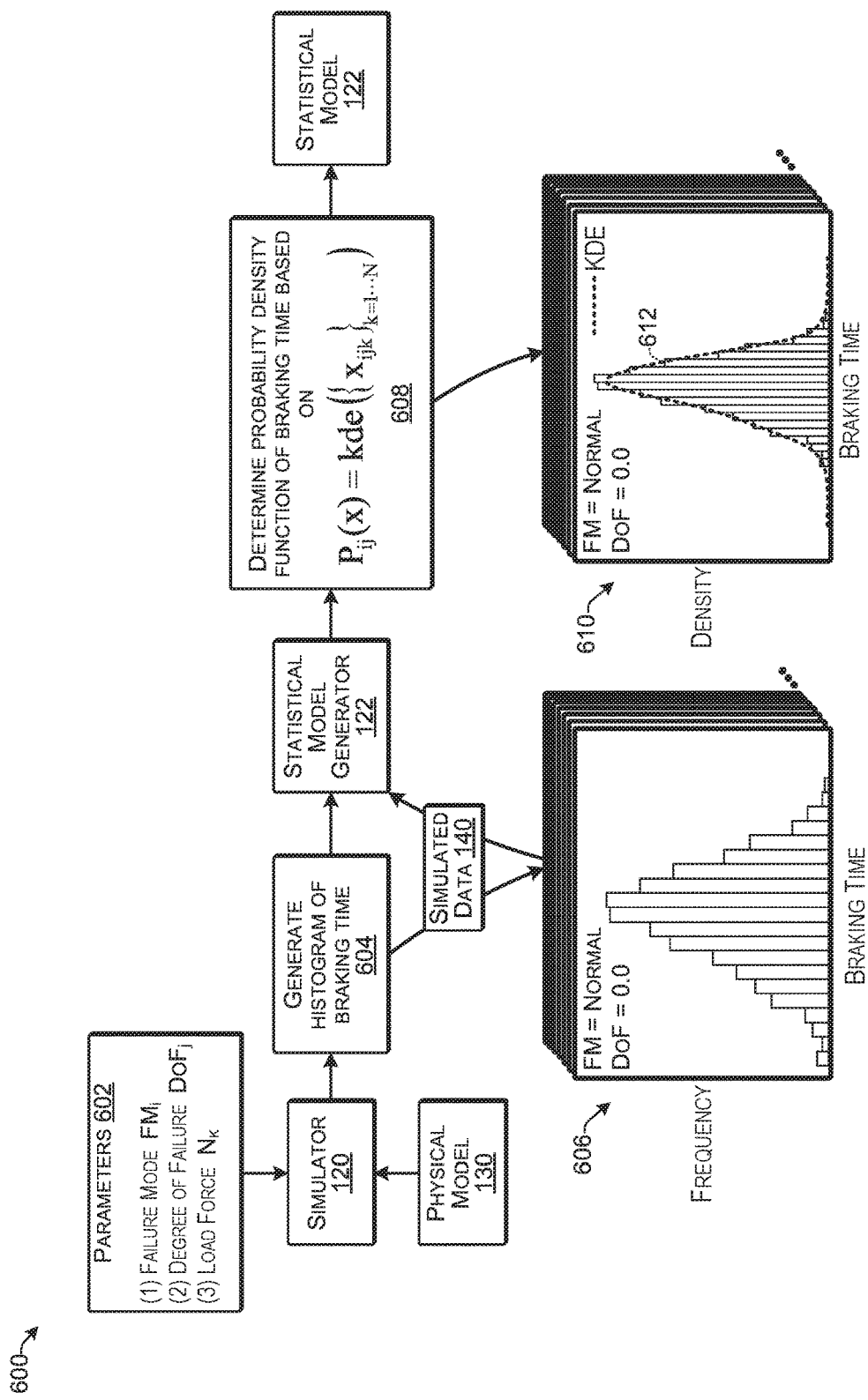
FIG. 6 illustrates an example of generating the statistical model according to some implementations.

FIG. 6 illustrates an example process 600 for determining a probability density function according to some implementations. The simulated data 140 may be represented as a plurality of histograms of the braking time for every degree of failure of every failure mode. As discussed above with respect to FIG. 5, the parameters 602 that are provided to the simulator 120 include the failure mode FM$_i$, the degree of failure DoF$_j$, and the load force N$_k$. As discussed above with respect to FIG. 5, and as indicated at 604, the simulator 120 uses the physical model 130 and the parameters 602 to generate the simulated data 140 which may include a plurality of histograms 606 of the braking time. Each histogram 606 may represent the braking time verses the number of samples (Frequency) for that braking time for each failure mode FM$_i$, and degree of failure DOF$_j$.

The simulated data 140 may be provided to the statistical model generator 122. Prior to using the simulated data 140 for generating the statistical model, the statistical model generator 122 may perform data smoothing on the simulated data. In the illustrated example, for data smoothing, the statistical model generator 122 may apply kernel density estimation (KDE) to each histogram 606 of the braking time. KDE is a non-parametric technique for estimating the probability density function of a random variable. KDE is a fundamental data smoothing problem where inferences about the population are made based on a finite data sample. Alternatively, other data smoothing techniques may be used in other examples.

As indicated at 608, the probability density $P_{ij}(x)$ may be calculated using the following equation (1) for each FM$_i$ and DOF$_j$:

$$P_{ij}(x)=kde(\{x_{ijk}\}_{k=1 \ldots N}) \quad (EQ\ 1)$$

where $x_{ijk}$ is the simulated braking time determined in FIG. 5. Thus, as indicated at 610 by applying KDE to each histogram 606, the statistical model generator 122 may generate a probability density 612 of the braking time corresponding to every failure mode and every degree of failure. As a result, statistical model generator 122 has probability density of braking time corresponding to every failure mode and every degree of failure. Statistical model generator 122 may create the statistical model 142 with the probability densities of the simulated data.

Figure 7:
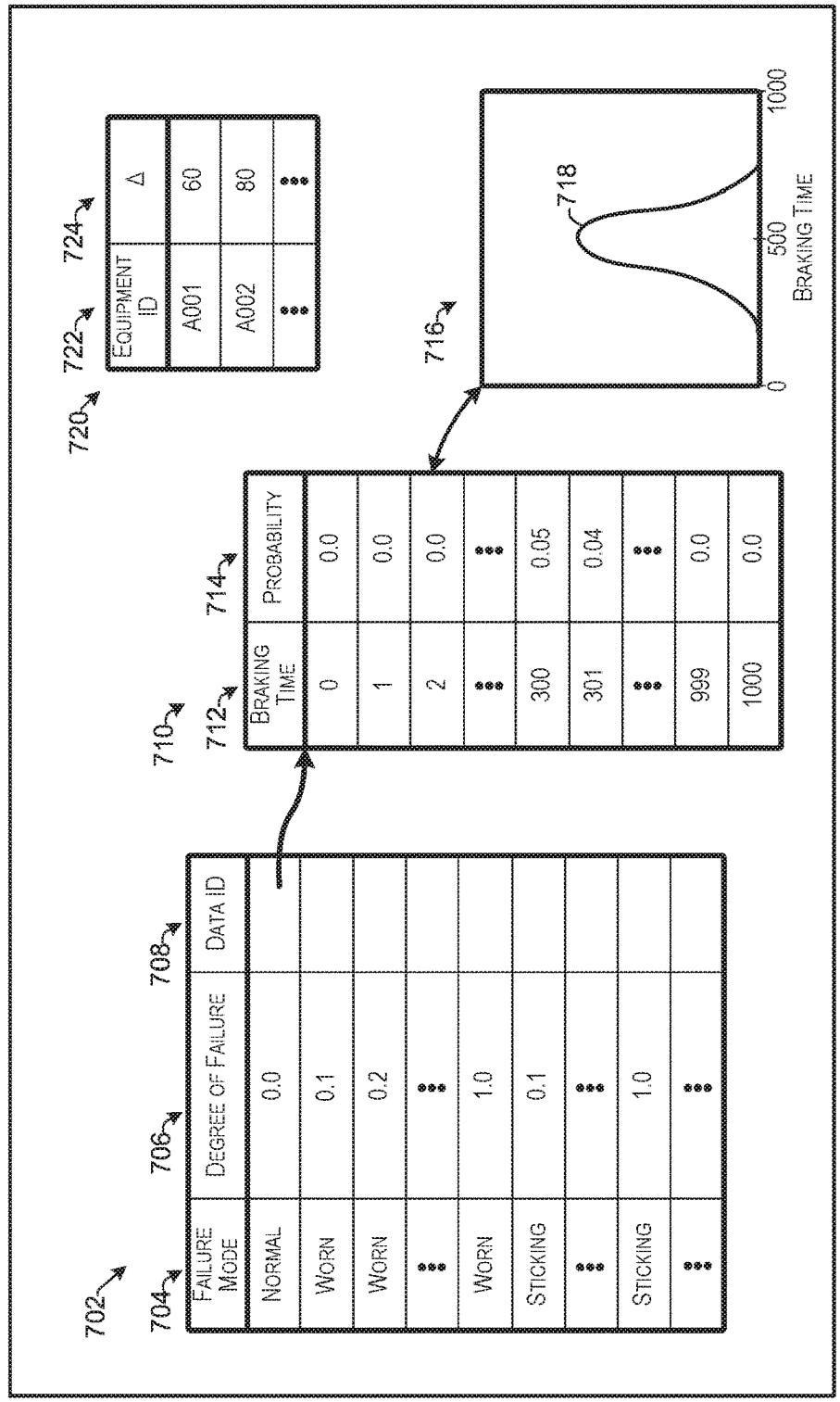
FIG. 7 illustrates an example of information included in the statistical model according to some implementations.

FIG. 7 illustrates an example of information that may be included in the statistical model 142 according to some implementations. For example, the statistical model 142 may include a failure mode data structure 702 that may include an indication of the failure modes 704 (e.g., normal, worn, sticking, etc.), the degrees of failure 706, and data IDs 708 of the associated probability data set 710. The probability data set 710 may include braking time 712 and associated probability 714 which represent a probability distribution for the degree of failure for the corresponding failure mode in the failure mode data structure 702. For instance, as indicated at 714, each probability data set 710 includes a plurality of probabilities 712 for different braking times, which may correspond to a probability distribution 712 for the particular degree of failure for the particular failure mode. Furthermore, the probability data 708 for each degree of failure may be normalized in relation to the other probability data sets 710 for the other degrees of failure and failure modes. In this example, as indicated at 716, the probability data 718 is normalized to a scale of 0 to 1000, but any other desired scale may be used in other examples.

In addition, the information associated with the statistical model 142 may include a delta table 720 that indicates a Δ associated with each equipment. Accordingly, delta table 720 may include the equipment ID 722 that identifies the equipment, and a difference Δ 724 that may be determined for the equipment. For example, it may not be possible to create a perfect physical model such that there is no deviation between the simulated data and the historical sensor data. Accordingly, regardless of how many times the physical model is refined above in the process of FIG. 4, there may still be some difference Δ between the historical sensor data and the simulated data. In some examples, if not accounted for, this Δ may lead to a false positive or false negative being produced by the statistical model.

To reduce the effect of the Δ, some implementations may apply additional normalization based on the Δ. For instance, the statistical model generator 122 may normalize the received sensor data for applying the statistical model to the received sensor data. For example, the received sensor data may be normalized based on the Δ, which may be approximated as the difference between the simulated data corresponding to the normal (non-failure) mode and the historical sensor data corresponding to the normal (non-failure) mode, i.e., the normal operating condition when the degree of failure is considered to be 0.0. The normalization in this example may be defined by the following equation (2):

$$x_t'=x_t-\Delta \qquad (EQ2)$$

where $\Delta=x_{sensorData\_normal}-s_{simulation\_normal}$; $x_t$ is the braking time from the received sensor data at time t; $x_t'$ is the normalized braking time for the received sensor data at time t; $x_{sensorData\_normal}$ is the braking time from the historical sensor data corresponding to the normal condition, i.e., when the degree of failure is considered to be 0.0; and $x_{simultation\_normal}$ is the braking time from the simulated data corresponding to the normal condition when the degree of failure is considered to be 0.0. Thus, Δ 724 may be determined in advance for the particular equipment 722 and for the simulation data used for the corresponding statistical model. The value for $x_t'$ may be determined after the sensor data $x_t$ is received based on the value for Δ. As one example, the computing device may determine Δ by determining a first probability distribution for the simulated data having a degree of failure categorized as normal operation, determining a second probability distribution for the historical sensor data having a condition categorized as normal operation, and by determining the difference Δ based on a deviation between the first probability distribution and the second probability distribution. As an alternative, another technique for normalizing the difference between the received sensor data and the simulated data may include applying a relative feature, such as a ratio of the difference value with respect to the normal condition. In this example, the absolute value, such as the braking time itself is not use, but instead, a relative value may be defined by the following equation (3):

$$x_t'=x_t-x_0 \qquad (EQ3)$$

where $x_t$ is the braking time at a time t; and $x_0$ is the braking time at the normal condition. Equation (3) may be used for both the simulated data and the received sensor data. For instance, since the normal condition braking time $x_0$ for the simulated data may differ from the normal condition braking time $x_0$ for the historical sensor data, the values for $x_t$ for the simulated data and for the sensor data are normalized according to this difference. Further, in other examples, x may be the braking force or other braking parameter. In still other examples, x is not one variable, but may include multiple variables. For example, x may be a vector that includes the braking time and the braking force.

Figure 8:
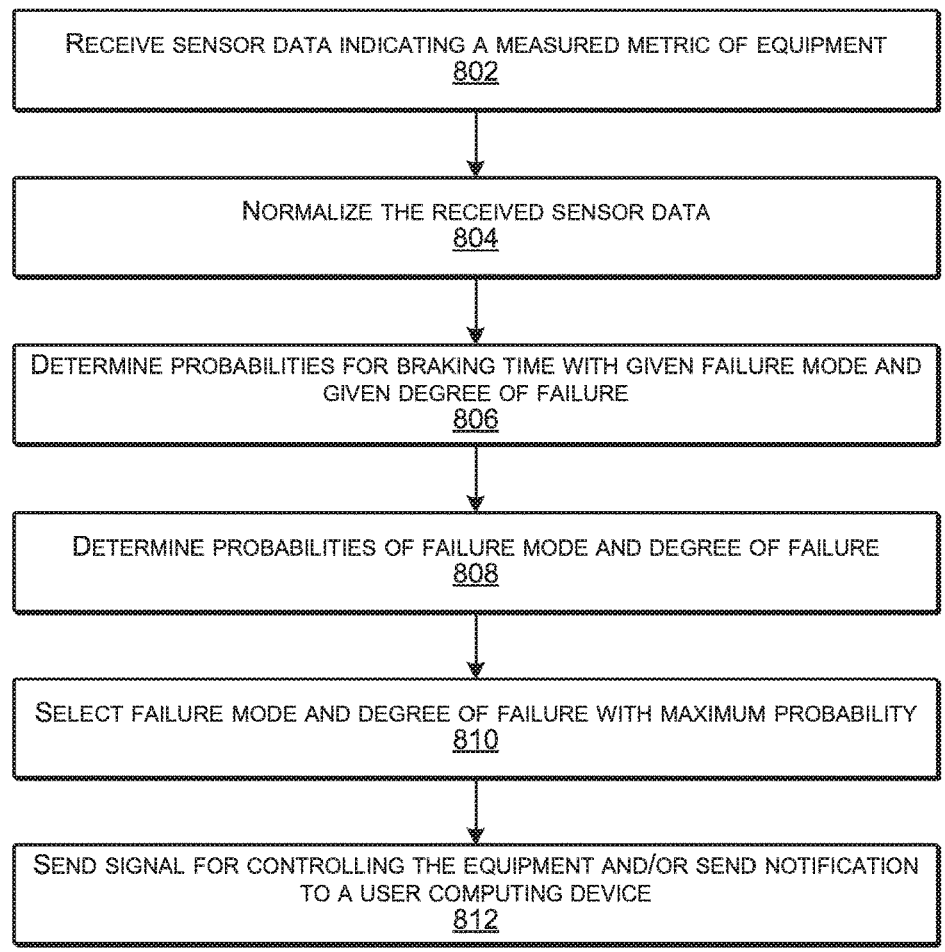
FIG. 8 is a flow diagram illustrating an example process for analyzing received sensor data based on the statistical model according to some implementations.

FIG. 8 is a flow diagram illustrating an example process 800 by which the predictor may predict a failure mode and degree of failure according to some implementations. In some examples, the process 800 may be executed by the computing device 102 or other suitable computing device.

At 802, the computing device may receive sensor data for analysis. For example, one or more of the sensors or the equipment may send the sensor data to the computing device. The sensor data may indicate at least one measured metric of the equipment, which in some examples herein is the braking time; however, other metrics may be used in other examples. For example, the sensor data may include braking force or other measured parameters. Further, in some cases, multiple parameters, such as a combination of braking time and braking force, may be used for determining the failure mode and degree of failure.

At 804, the computing device may normalize the received sensor data to better conform to the statistical model using equation (2) or equation (3) discussed above.

At 806, the computing device may determine probabilities for braking time for given failure modes and given degrees of failure. For example, as discussed above with respect to FIGS. 6 and 7, the statistical model generator may calculate probabilities corresponding to every failure mode and every degree of failure to provide the statistical model.

At 808, the computing device may determine probabilities of the failure mode and the degree of failure. For example, the predictor may calculate all posterior probabilities P(DoF, FM|$x_t'$). FIG. 9 illustrates an example data structure that may be determined based on the result of these calculations. These calculations may be performed based on the following equation (4):

$$P(x_t' \mid FM_i, DoF_j) = \int_{x_t-\varepsilon}^{x_t+\varepsilon} p(x_t' \mid FM_i, DoF_j)dx \qquad (EQ4)$$

$$P(FM_i, DoF_j \mid x_t') = \frac{P(x_t' \mid FM_i, DoF_j)P(FM_i, DoF_j)}{P(x_t')}$$

At 810, the computing device may select a failure mode and degree of failure with the maximum probability. For example, the computing device may compare the normalized sensor data with the posterior probabilities calculated at 808, and may select the degree of failure corresponding to the maximum posterior probabilities such as according to following equation (5):

$$i\_max, j\_max = \arg\max(P(FM_i, DoF_j|x_t')) \qquad (EQ5)$$

An example of determining the failure mode FM and degree of failure DoF with the maximum probability based on EQ 5 is discussed additionally below with respect to FIG. 9. Accordingly, based on the probabilities in the data structure of FIG. 9, when $x_t'$ is a single value (e.g., a braking time), the maximum probability may be determined from the data structure of FIG. 9 for determining the failure mode and degree of failure corresponding to the received sensor data.

Alternatively, in the case that the received sensor data is a distribution of measured metrics, the EQ 6 and 7 discussed below may be used for determining the failure mode and degree of failure. For instance, when the computing device receives a distribution of braking times $x_t'$, the computing device may calculate a distance as a relative entropy between a distribution of normalized sensor data, $q(x_t')$ and a plurality of distributions corresponding to every failure mode and every degree of failure based on the following equation (6).

$$KL(p(x_t' \mid FM_i, DoF_j) \| q(x_t')) = \qquad (EQ6)$$
$$-\int p(x_t' \mid FM_i, DoF_j)\ln\left\{\frac{q(x_t')}{p(x_t' \mid FM_i, DoF_j)}\right\}dx_t'$$

Then, the computing device may select a failure mode and degree of failure with the minimum relative entropy based on the following equation (7):

$$i\_min, j\_min = \arg\min(KL(p(x_t'|FM_i, DoF_j) \| q(x_t'))) \qquad (EQ7)$$

An example of this technique is discussed additionally below with respect to FIG. 10. Additionally, in some cases, x may be a different parameter, such as braking force, or a combination of parameters, such as a vector that combines braking time and braking force.

At 812, based at least partially on the failure mode and degree of failure determined to have the maximum probability, the computing device may send a signal for controlling the target equipment, and/or may send a notification to a user computing device, such as a user computing device associated with a monitoring system for monitoring the equipment. As one example, the computing device may send a signal to control the equipment, such as for controlling the equipment itself or a machine associated with the equipment. For instance, in the case that the equipment is a brake for an elevator, the computing device may send a control signal to control the brake, such as for increasing the braking force, or the like. In other examples, such as in the case that the computing device determines that the condition of the brake has deteriorated so that operation the elevator is no longer safe, the computing device may send a signal for ceasing an operation of the elevator until the brake is repaired. Additionally, or alternatively, as another example, the computing device may send a notification to a monitoring system, such as to a user computing device. Further, in some examples, the control signal may only be sent to the target equipment in certain situations. For example, if a threshold level of urgency is determined, the computing device may send a control signal for shutting down the equipment and may also send a notification to the user computing device. For instance, the computing device may send a notification to cause an alert to be presented on the display 156 of the user computing device 110 to alert equipment personnel to take corrective action.

As another example, suppose that the equipment is a brake in a vehicle, such as a train, truck, bus, automobile, airplane, or the like, and the brake 202 may be used for slowing or stopping the vehicle. The computing device may send a control signal to control the brake, such as for increasing the braking force when the brake is applied based on determining the degree of failure of the brake. In other examples, such as in the case that the computing device determines that the condition of the brake has deteriorated so that operation of the vehicle is no longer safe, the computing device may send an emergency alert or other notification to an operator of the vehicle to provide notice that operation of vehicle is not safe until the brake is repaired.

FIG. 9 illustrates an example data structure 900 including the posterior probabilities according to some implementations. In this example, the data structure 900 corresponds at least partially to the data structure 702 of FIG. 7, and includes the failure mode 704 and degree of failure 706. In this example, the posterior probability 902 for each failure mode and for each degree of failure has been determined for the received sensor data, such as using EQ4 discussed above with respect to FIG. 8. In this example, based on the information in the data structure 900, suppose that the maximum posterior probability 902 is 0.40, as indicated at 904. Accordingly, based on the determination of the maximum probability at 904, the failure mode may be determined to be that the brake is "worn", and the degree of failure is determined to be 0.2. The operator may use this information as an analysis result, e.g., as discussed additionally below with respect to FIG. 11.

Figure 10:
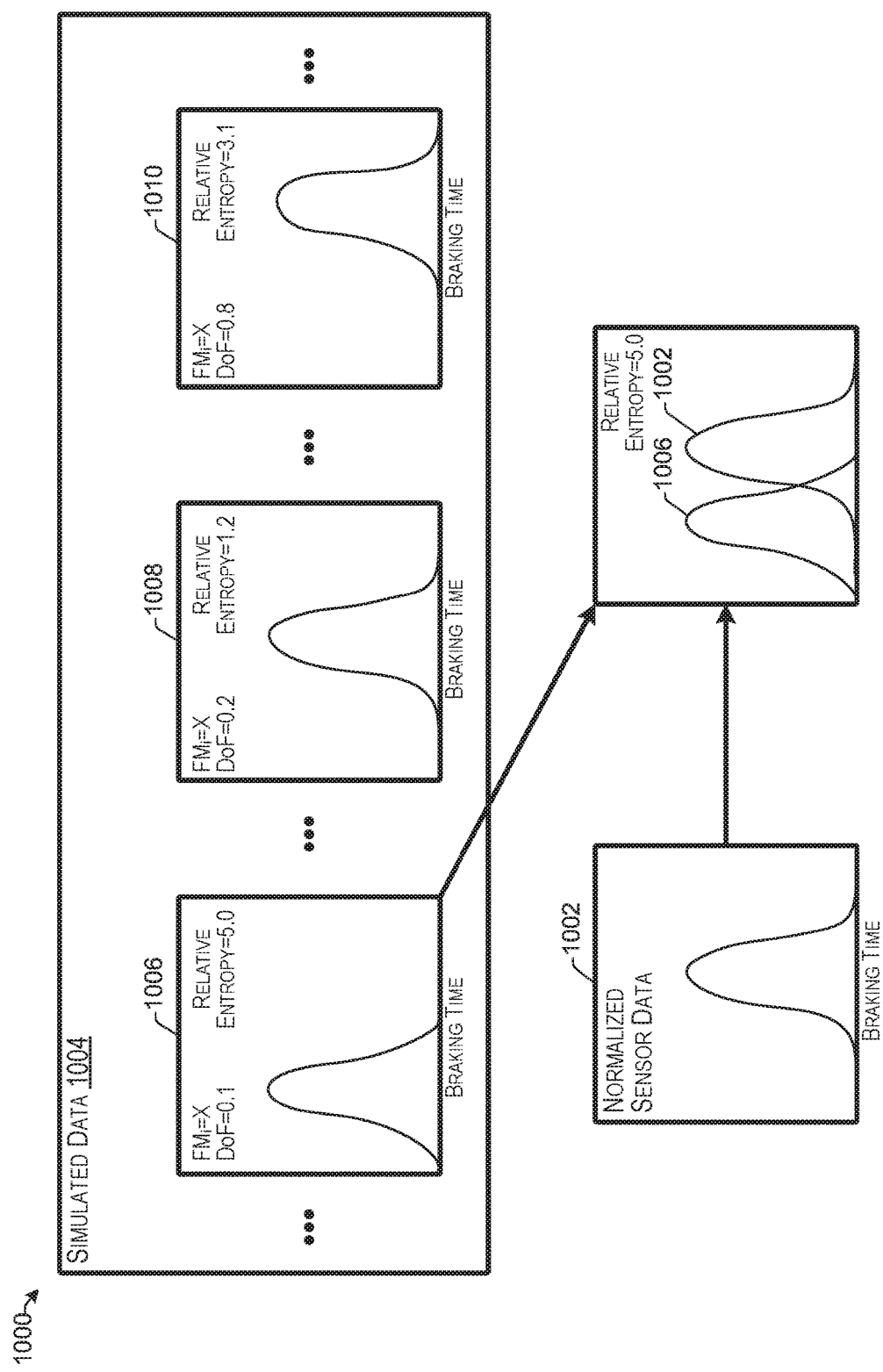
FIG. 10 illustrates an example of determining a failure mode based on determined distances according to some implementations.

FIG. 10 illustrates an example 1000 of determining, based on the received sensor data, a failure mode and a degree of failure with a maximum probability according to some implementations. For instance, in some cases, the computing device may receive the sensor data as a distribution of detected sensor values and may generate normalized sensor data 1002 based on applying one of equations (2) or (3) discussed above. As discussed above with respect to FIG. 8, when the computing device receives a distribution of braking times $x_t'$, the computing device may determine, a distance as a relative entropy between a distribution of normalized sensor data, $q(x_t')$ and a plurality of distributions of the simulation data 1004 corresponding to every failure mode and every degree of failure based on EQ6 discussed above. Thus, the computing device may determine a plurality of relative entropies, such as 1006, 1008, and 1010 as several examples out of many that would be determined. The computing device may apply EQ7 discussed above to determine the failure mode and degree of failure with the minimum relative entropy with respect to the normalized sensor data 1002. Accordingly, in this example, suppose that the simulated data 1006 has a relative entropy of 5.0 with respect to the normalized sensor data 1002, the simulated data 1008 has a relative entropy of 1.2 with respect to the normalized sensor data 1002, and the simulated data 1010 has a relative entropy of 3.1 with respect to the normalized sensor data 1002. Furthermore, suppose that the computing device determines that the simulated data 1008 has the minimum relative entropy with respect to the normalized sensor data 1002 out of all the simulated data 1004. Accordingly, the computing device may determine that the current condition of the equipment is closest to the condition specified by the simulated data 1008, which may be the failure mode X and the degree of failure 0.2. The predictor may provide this information to the operator, which may determine a condition of the equipment based on the indicated failure mode and degree of failure, as discussed additionally below with respect to FIG. 11.

FIG. 11 illustrates an example data structure 1100 including analysis results generated by the predictor from the received sensor data and the statistical model according to some implementations. The data structure 1100 includes equipment ID 1102, a time 1104, a break time 1106, a machine condition 1108, a failure mode 1110 and a degree of failure 1112. As one example, the operator of the management application discussed above with respect to FIGS. 1 and 2 may generate the data structure 1100 and may perform further operations based on the content of the data structure 1100. For instance, as indicated at 1114, the failure mode was determined to be normal with 0.0 degree of failure accordingly, the operator designated machine condition 1108 to be normal. In such a case, the operator may take no action or, alternatively, may send a notification to the user computing device or other monitoring system indicating that the condition of the equipment is normal.

As another example, as indicated at 1116, suppose that the analysis result indicates the failure more mode is that the brakes are worn and the degree of failure is 0.5. In this example, the operator may determine that a machine condition is "warning" and as a result, the operator may send a notification to the user computing device 110 or other monitoring system indicating that the equipment is worn and that maintenance should be performed.

As another example, as indicated at 1118, suppose that the analysis result indicates that the failure more mode is that the brakes are worn and the degree of failure is 0.8. In this example, the operator may send a notification to the user computing device 110 or other monitoring system indicating that the equipment is worn and that an alert has been issued. Furthermore, based on the alert being issued, the operator may shut down the equipment and/or a machine associated with the equipment as being unsafe until maintenance is performed on the equipment. As one example, thresholds may be established for determining the machine conditions 1108 such as "normal" being a DoF<0.4, "warning" being 0.4<DoF<0.7, and "alert" being a DoF>0.7, or other suitable thresholds, such as may be determined by equipment personnel. Furthermore, in some examples herein there may be more or less than three machine conditions 1108.

In addition, at 1120, suppose that the failure mode is that the brake is sticking and that the degree of failure is 0.3. In some examples, the degree of failure thresholds for "normal", "warning", and "alert" may be different for different failure modes, while in other examples, the thresholds may be the same. For instance, suppose that a brake that is sticking may be more dangerous than a brake that is worn, and accordingly, the warning and/or alert may be generated at a lower threshold, or the like. In this example, suppose that the "warning" may be generated at 0.3 DoF for the sticking failure mode and 0.4 DoF for the worn failure mode.

Figure 12:
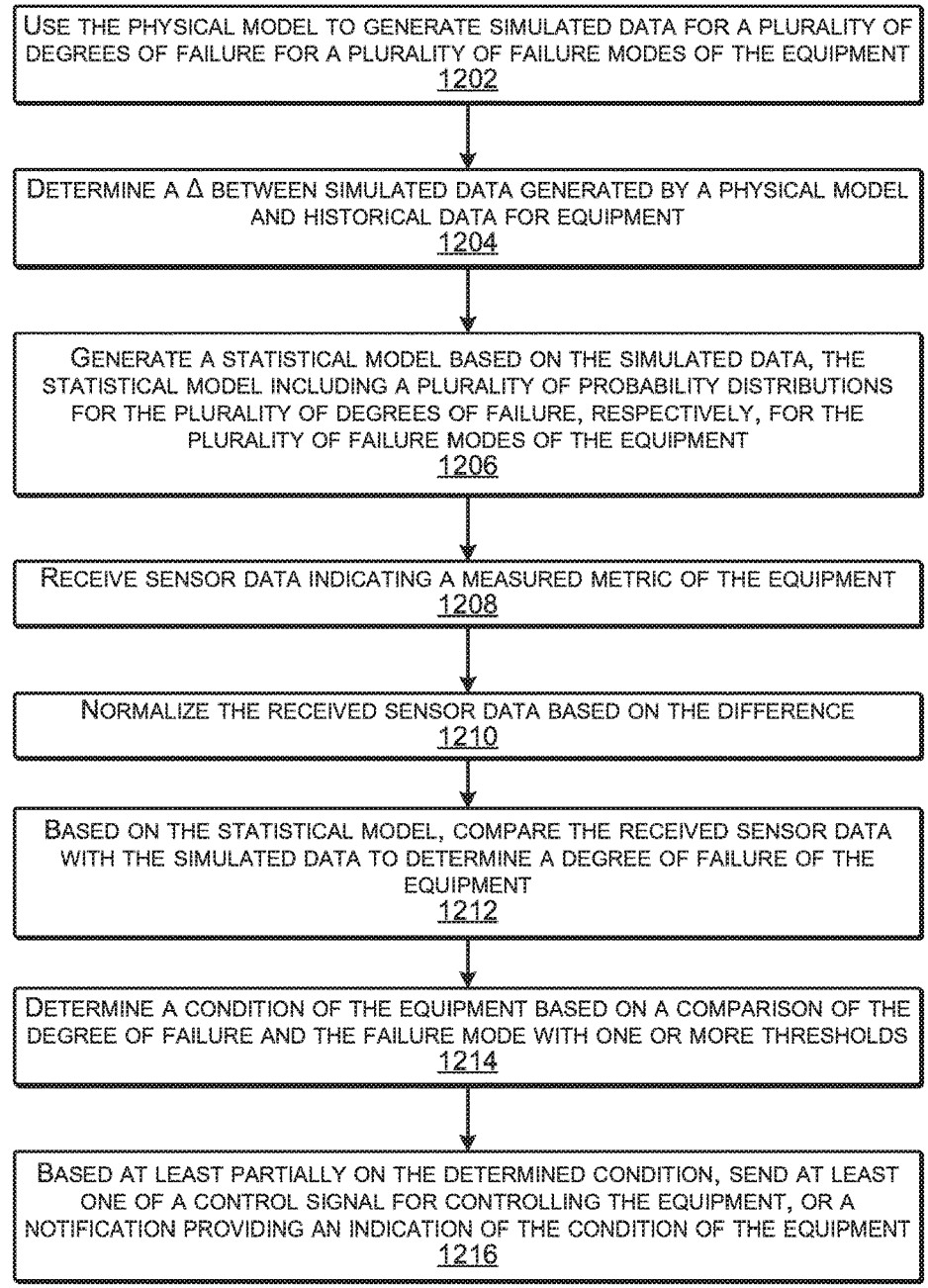
FIG. 12 is a flow diagram illustrating an example process for controlling equipment and/or sending a notification according to some implementations.

FIG. 12 is a flow diagram illustrating an example process 1200 for controlling equipment and/or sending a notification according to some implementations. In some examples, the process 1200 may be executed by the computing device 102 or other suitable computing device.

At 1202, the computing device may use a physical model to generate simulated data for a plurality of degrees of failure for a plurality of failure modes of an equipment. For example, the simulated data may include a plurality of probability distributions of a plurality of degrees of failure, respectively, for a plurality of failure modes of the equipment.

At 1204, the computing device may determine a difference $\Delta$ between the simulated data generated using the physical model and historical sensor data for the equipment. For example, the computing device may receive the historical sensor data corresponding to the equipment operation in a normal mode (non-failure mode). Further, the computing device may determine the probability distribution for the simulated data having a degree of failure categorized as normal operation, and may determine a second probability distribution for the historical sensor data having a condition categorized as normal operation. The computing device may determine the difference $\Delta$ based on a deviation between the first probability distribution and the second probability distribution.

At 1206, the computing device may generate a statistical model based on the simulated data, the statistical model including a plurality of probability distributions for the plurality of degrees of failure, respectively, for the plurality of failure modes of the equipment. For example, the computing device may determine probability densities of the plurality of probability distributions of the plurality of degrees of failure, respectively, for the plurality of failure modes of the equipment. Further, the computing device may determine posterior probabilities for the probability densities for the plurality of probability distributions of the plurality of degrees of failure, respectively, for the plurality of failure modes.

At 1208, the computing device may receive sensor data indicating a measured metric of the equipment. For example, the computing device may receive sensor data from one or more sensors associated with the equipment. In some examples, the measure metric may be a measured braking time, braking force, and/or other parameter.

At 1210, the computing device may normalize the received sensor data based on the difference $\Delta$. Examples of normalizing the received sensor data are discussed above with respect to equations (2) and (3).

At 1212, based on the statistical model, the computing device may compare the received sensor data with the simulated data to determine a degree of failure of the equipment. For instance, in the case that the received sensor data is an individual measurement, the computing device may determine the failure mode and degree of failure of the equipment from determining a maximum probability based on the posterior probabilities calculated using EQ4 and EQ5. Alternatively, in the case that the received sensor data is a distribution of sensor measurements, the computing device may determine the failure mode and degree of failure of the equipment by determining a minimum relative entropy using EQ6 and EQ7 between the received sensor data and the plurality of the probability distributions of the simulated data.

At 1214, the computing device may determine a condition of the equipment based on a comparison of the degree of failure and the failure mode with one or more thresholds. For example, the computing device may compare the failure mode and the degree of failure of the equipment with one or more thresholds to determine a condition of the equipment. As one example, in the case that the equipment is a brake, the computing device may compare the failure mode and the degree of failure of the brake with one or more thresholds to determine, e.g., that wear of the brake exceeds a threshold of acceptable wear.

At 1216, based at least partially on the determined condition, the computing device may send at least one of a control signal for controlling the equipment, or a notification providing an indication of the condition of the equipment. In the case discussed above, in which the equipment is a brake, at least partially based on determining that wear of the brake exceeds a threshold of acceptable wear, the computing device may send a control signal to a machine of which the brake is a component to control the machine, such as to cause the machine to cease at least one operation, and/or to control the component, such as to increase a braking force, or the like. For instance, if the machine is an elevator, the computing device may send a signal to cause the elevator to cease operation until the brake can be repaired, if the machine is a vehicle, the applied braking force maybe increased, and so forth, as discussed above.

The example processes described herein are only examples of processes provided for discussion purposes. Numerous other variations will be apparent to those of skill in the art in light of the disclosure herein. Further, while the disclosure herein sets forth several examples of suitable systems, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors; and
one or more non-transitory computer-readable media maintaining executable instructions, which, when executed by the one or more processors, program the one or more processors to perform operations comprising:
receiving a physical model of an equipment including a brake;
generating simulated data corresponding to braking times for the brake based on the physical model, the simulated data including a plurality of probability distributions of a plurality of degrees of failure, respectively, for at least one failure mode of the brake;
determining a difference between the simulated data for the brake generated based on the physical model and historical data for the brake maintained in a data structure;
receiving sensor data including at least one measured metric indicating a condition of the brake;
normalizing the received sensor data based on the difference between the simulated data and the historical data;
comparing the normalized sensor data with the simulated data to determine a failure mode and a degree of failure of the brake; and
sending a control signal for controlling the equipment based at least in part on the determined failure mode and degree of failure of the brake.

2. The system as recited in claim 1, wherein the operation of determining the difference between the simulated data and the historical data for the brake comprises:
receiving the historical data corresponding to the brake, the historical data including historical sensor data associated with the brake, the historical data further including historical maintenance data indicating respective conditions of the brake corresponding to the historical sensor data;
determining a first probability distribution for the simulated data having a degree of failure categorized as normal operation;
determining a second probability distribution for the historical data having a condition categorized as normal operation; and
determining the difference based on a deviation between the first probability distribution and the second probability distribution.

3. The system as recited in claim 1, the operations further comprising:
receiving the physical model as a candidate physical model generated at least partially based on experimental data corresponding to the brake;
executing a simulation using the candidate physical model to obtain test simulated data;
determining a difference between the test simulated data and the experimental data; and
receiving the physical model based at least partially on updating one or more parameters of the candidate physical model based on determining that the difference between the test simulated data and the experimental data exceeds a threshold.

4. The system as recited in claim 1, wherein comparing the normalized sensor data with the simulated data to determine the degree of failure of the brake comprises:
generating a statistical model based on the simulated data, the statistical model including a plurality of the probability distributions for a plurality of the degrees of failure, respectively, for a plurality of the failure modes of the brake; and
comparing the normalized sensor data with the plurality of the probability distributions to determine a failure mode and degree of failure having a maximum probability.

5. The system as recited in claim 1, the operations further comprising:
comparing the failure mode and the degree of failure of the brake with one or more thresholds to determine a condition of the brake; and
at least partially based on the condition, sending a notification to a computing device, the notification including an indication of the condition.

6. The system as recited in claim 1, wherein the brake is a component of a machine, the operations further comprising:
comparing the failure mode and the degree of failure of the brake with one or more thresholds to determine that wear of the brake exceeds a threshold of acceptable wear; and
at least partially based on determining that wear of the brake exceeds the threshold of acceptable wear, sending the control signal to the machine of which the brake is the component to cause the machine to cease operation.

7. A system comprising:
one or more processors; and
one or more non-transitory computer-readable media maintaining executable instructions, which, when executed by the one or more processors, program the one or more processors to:
determine a difference between simulated data generated by a physical model of an equipment and historical data for the equipment;
generate a statistical model based on the simulated data, the statistical model including a plurality of probability distributions for a plurality of degrees of failure, respectively, for at least one failure mode of the equipment;
receive sensor data indicating a measured metric of the equipment;
normalize the received sensor data based on the difference;
based on the statistical model, compare the normalized sensor data with the simulated data to determine a degree of failure of the equipment; and
perform at least one action based on the determined degree of failure.

8. The system as recited in claim 7, wherein performing the at least one action comprises at least one of:

sending a control signal to the equipment for controlling the equipment based on the determined degree of failure; or sending a notification to at least one computing device associated with monitoring the equipment, the notification including an indication of the condition of the equipment.

9. The system as recited in claim 7, wherein the one or more processors are further programmed to:

compare the degree of failure of the equipment with one or more thresholds to determine a condition of the equipment; and determine the at least one action to perform at least partially based on the determined condition.

10. The system as recited in claim 7, wherein the normalized sensor data includes a distribution of sensor measurements, and the one or more processors are further programmed to compare the normalized sensor data with the simulated data to determine a degree of failure of the equipment by:

determining a distance between a normalized distribution of the received sensor data and the plurality of probability distributions for the plurality of degrees of failure to determine relative entropies; and selecting a degree of failure based on the relative entropies.

11. The system as recited in claim 7, wherein the received sensor data includes an individual sensor measurement, and the one or more processors are further programmed to compare the received sensor data with the simulated data to determine a degree of failure of the equipment by:

determining probability densities of the plurality of probability distributions of the plurality of degrees of failure;

determining posterior probabilities for the probability densities for the plurality of probability distributions, respectively; and selecting a degree of failure based on a maximum posterior probability.

12. The system as recited in claim 7, wherein at least a first one of the processors is remote from the equipment and/or the sensors, such as over a network, while at least a second one of the processors is co-located with the equipment such connected to communicate directly with the equipment and/or the sensors.

13. An apparatus comprising:
one or more processors; and
a non-transitory computer-readable medium storing executable instructions, which, when executed by the one or more processors, configure the one or more processors to perform operations comprising:

using a physical model of an equipment to generate simulated data of equipment operation;

determining a difference between the simulated data generated from the physical model of the equipment and historical data for the equipment, the historical data including historical sensor data associated with the equipment and historical maintenance data indicating respective conditions of the equipment corresponding to the historical sensor data;

generating a statistical model using at least the simulated data, the statistical model including a plurality of probability distributions for a plurality of degrees of failure, respectively, for at least one failure mode of the equipment;

receiving sensor data indicating a measured metric of the equipment;

normalizing the received sensor data based on the difference between the simulated data and the historical data;

based on the statistical model, comparing the normalized sensor data with the simulated data to determine a degree of failure of the equipment; and performing at least one action based on the determined degree of failure.

14. The apparatus as recited in claim 13, wherein the operation of performing the at least one action comprises at least one of:

sending a control signal to the equipment for controlling the equipment based on the determined degree of failure; or sending a notification to at least one computing device associated with monitoring the equipment, the notification including an indication of the condition of the equipment.

15. The apparatus as recited in claim 13, wherein the operation of determining the difference between the simulated data and the historical data for the equipment comprises:

receiving the historical data corresponding to the equipment from a data structure maintained in the non-transitory computer-readable medium;

determining a first probability distribution for the simulated data having a degree of failure categorized as normal operation;

determining a second probability distribution for the historical data having a condition categorized as normal operation; and determining the difference based on a deviation between the first probability distribution and the second probability distribution.

16. The apparatus as recited in claim 13, the operations further comprising:

receiving the physical model as a candidate physical model generated at least partially based on experimental data corresponding to the equipment;

executing a simulation using the candidate physical model to obtain test simulated data;

determining a difference between the test simulated data and the experimental data; and receiving the physical model based at least partially on updating one or more parameters of the candidate physical model based on determining that the difference between the test simulated data and the experimental data exceeds a threshold.

17. The apparatus as recited in claim 13, wherein the statistical model includes a plurality of the probability distributions for a plurality of the degrees of failure, respectively, for a plurality of the failure modes of the equipment, the operations further comprising comparing the normalized sensor data with the plurality of the probability distributions to determine a failure mode and degree of failure having a maximum probability.

18. The apparatus as recited in claim 13, wherein the normalized sensor data includes a distribution of sensor measurements, and the one or more processors are further programmed to compare the normalized sensor data with the simulated data to determine a degree of failure of the equipment by:

determining a distance between a normalized distribution of the received sensor data and the plurality of probability distributions for the plurality of degrees of failure to determine relative entropies; and selecting a degree of failure based on the relative entropies.

19. The apparatus as recited in claim 13, wherein the equipment is a component of a machine, the operations further comprising:

comparing the failure mode and the degree of failure of the equipment with one or more thresholds to determine that wear of the equipment exceeds a threshold of acceptable wear; and at least partially based on determining that wear of the equipment exceeds the threshold of acceptable wear, performing the at least one action by sending a control signal to the machine of which the equipment is the component to cause the machine to cease operation.

* * * * *